United States Patent
Lekkalapudi et al.

(10) Patent No.: US 8,949,195 B1
(45) Date of Patent: Feb. 3, 2015

(54) METHOD AND SYSTEM FOR MULTI-DIMENSIONAL LOGGING FOR ENTERPRISE APPLICATIONS

(71) Applicant: EMC Corporation, Hopkinton, MA (US)

(72) Inventors: Chaithanya Lekkalapudi, Palamaner (IN); Sateesh Arvapally, Garidepally (IN)

(73) Assignee: EMC Corporation, Hopkinton, MA (US)

( * ) Notice: Subject to any disclaimer, the term of this patent is extended or adjusted under 35 U.S.C. 154(b) by 210 days.

(21) Appl. No.: 13/627,148

(22) Filed: Sep. 26, 2012

(51) Int. Cl.
*G06F 17/30* (2006.01)

(52) U.S. Cl.
USPC .......................................... 707/672; 707/736

(58) Field of Classification Search
CPC .......... G06F 17/30194; G06F 11/1456; G06F 15/16; G06F 17/30
See application file for complete search history.

(56) References Cited

U.S. PATENT DOCUMENTS

| 2003/0110155 A1* | 6/2003 | Minagawa ........................ 707/1 |
| 2014/0040306 A1* | 2/2014 | Gluzman Peregrine et al. ............................. 707/769 |

* cited by examiner

*Primary Examiner* — Anteneh Girma
(74) *Attorney, Agent, or Firm* — Dergosits & Noah LLP; Todd A. Noah

(57) ABSTRACT

Multi-dimensional logging for enterprise applications is described. A computer executes a logging mechanism. The logging mechanism receives, via a user interface, selections of log detail levels that range from a minimum log detail level to a maximum log detail level, of contexts that include at least two of an analytics context, a security context, a performance context, and a health context, and use cases that include at least two of an export use case, a save use case, an import use case, a check-in use case, and a check-out use case. The logging mechanism creates a multi-dimensional logging artifact based on selections of log detail levels, contexts, and use cases, and utilizes the multi-dimensional logging artifact with log data to create refined log data based on the selections of log detail levels, contexts, and use cases. The refined log data assists a user in evaluating an enterprise application.

20 Claims, 4 Drawing Sheets

METHOD AND SYSTEM FOR MULTI-DIMENSIONAL LOGGING FOR ENTERPRISE APPLICATIONS

BACKGROUND

Logs are important runtime information for any enterprise application deployed in production. Information extracted out of logs is used in a wide variety of ways over the lifetime of any application deployment, such as identifying access and/or security violations, troubleshooting a product issue, analyzing application performance, extracting performance metrics such as response times and run time memory usage, building a knowledge base related to usage patterns and/or trends, and analyzing large amounts of data, such as recommendation engines. Often the information that is captured in logs is turned into knowledge which can be used to improve the predictability and/or usability of an enterprise application. The kind of information and the amount of information that needs to be captured and processed in logs varies based on the requirements. For example, a log processing module that probes logs for security violations may evaluate information related to users, access control, and sequences of actions that have been performed on the data managed by that application. The traditional logging mechanisms used by loggers are linear, where a user can specify the level of detail required and various parameters, such as the package scope in which the logs need to be generated and the format of the logged data. These traditional logging mechanisms mostly rely on the log statements that have been embedded into the business logic of enterprise applications for various levels and details to generate a generic set of logs. Single log statements are used to extract all of the information required to analyze all kinds of issues.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
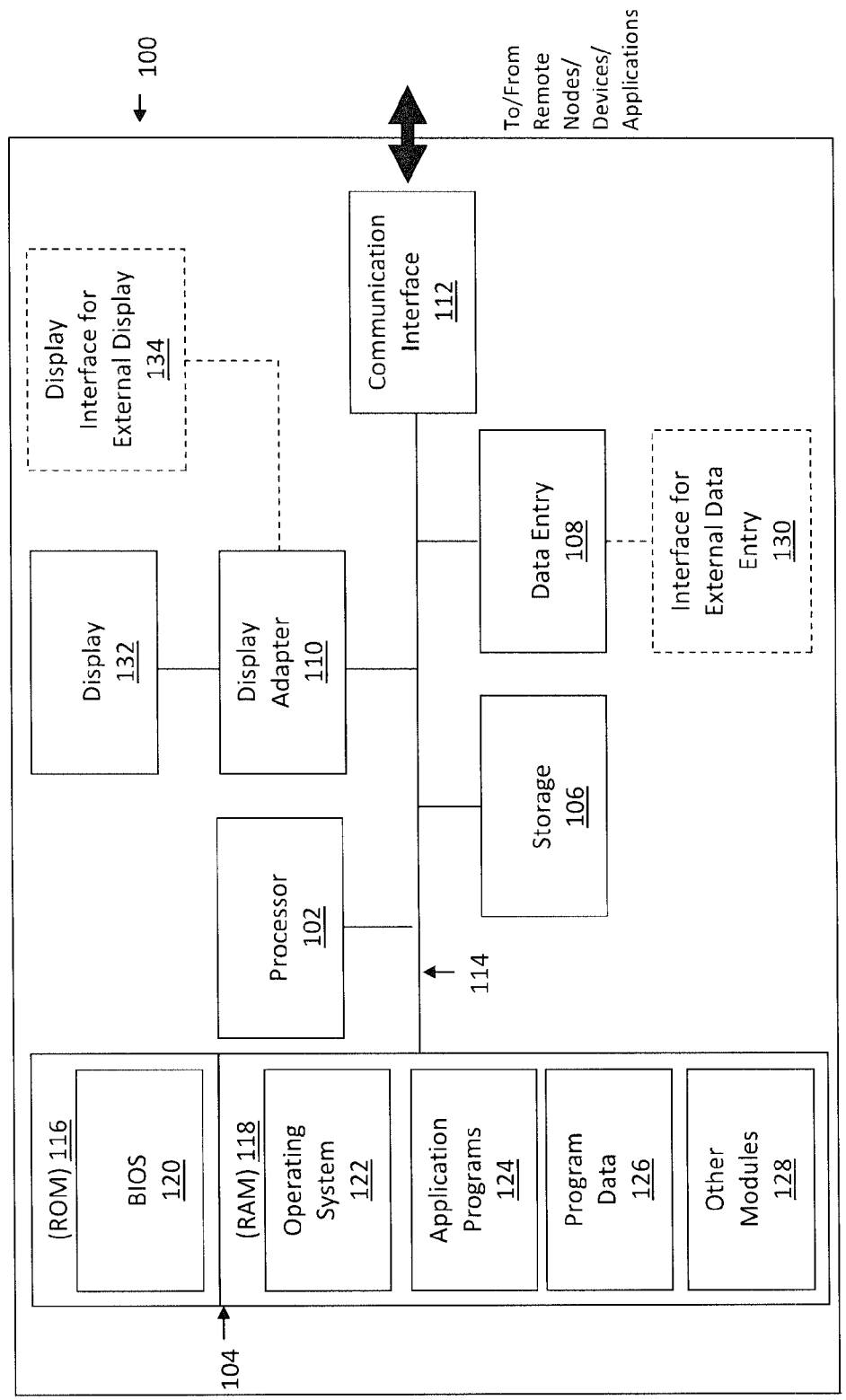
FIG. 1 is a block diagram illustrating an example hardware device in which the subject matter may be implemented.

Generated logs need to be analyzed and processed to extract the exact details required for multiple different situations. This becomes increasingly more difficult when logs from multiple layers in a software system need to be analyzed. The kind of the data that is traditionally captured in logs is predefined. However, the data that needs to be captured may vary based on the use case that needs to be troubleshot, or the context in which the data is evaluated. The kind of the data that is required to troubleshoot any memory bottleneck may not be same as the kind of data that is required for troubleshooting a malfunctioning issue.

The subject matter presented herein provides a multi-dimensional logging for enterprise applications that offers solutions to prior art problems. Multi-dimensional logging for enterprise applications adds the dimension of context and the dimension of use case to the existing dimension of the log detail level. The context dimension specifies the context in which data needs to be captured in logs. For example, logs may be required to extract data in the context of failure analysis, or logs may be required to extract data in the context of performance metrics, such as time or memory. The use case dimension specifies the specific scenario in which data needs to be captured in logs. Any software applications may have multiple use cases in which an end user or a related module can interact, such as exporting data or importing data. The use case dimension determines the target use for which data need to be extracted to logs. Adding the context dimension and the use case dimension to the log detail level dimension allows a user to capture only the desired data into logs.

A computer executes a logging mechanism that receives, via a user interface, selections for multi-dimensional logging. These selections include log detail levels that range from a minimum log detail level to a maximum log detail level. These selections also include contexts, such as any combination of an analytics context, a security context, a performance context, and a health context. These selections further include use cases, such as any combination of an export use case, a save use case, an import use case, a check-in use case, and a check-out use case. The logging mechanism creates a multi-dimensional logging artifact based on the selections of log detail level, context, and use case. The logging mechanism applies the multi-dimensional logging artifact to log data to create refined log data based on the selections of log detail level, context, and use case. The refined log data assists a user in evaluating an enterprise application. Multi-dimensional logging provides better control over the kind of the data that need to be captured in the logs, the pattern in which the data need to be captured, the module and/or communication channel that need to be intercepted for data, and the logging application logic that needs to be executed. Multi-dimensional logging customizes the capturing of data into logs based on selected use cases and contexts, thereby providing a significant improvement in log analytics. The capability to host a multi-dimensional logging artifact as a cloud solution supports intelligent logging across multiple applications in distributed environments. Multi-dimensional logging helps administrators and/or troubleshooters to quickly comprehend their log data with better insight, thereby significantly improving trouble shooting and root-cause analysis. Multi-dimensional logging potentially reduces the amount of data stored in the logs since the multi-dimensional logging artifact will extract only the required information.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for multi-dimensional logging for enterprise applications.

In the prior art process, the analysis and processing of generated logs to extract the exact details required for multiple different situations becomes increasingly more difficult when logs from multiple layers in a software system need to be analyzed. While the kind of the data that is traditionally captured in logs is predefined, the data that needs to be captured may vary based on the use case that needs to be troubleshot and the context in which the data is evaluated. The kind of the data that is required to troubleshoot any memory bottleneck may not be same as the kind of data that is required for troubleshooting a malfunctioning issue.

Embodiments herein offer solutions to prior art problems by providing multi-dimensional logging for enterprise applications. Multi-dimensional logging provides better control over the kind of the data that need to be captured in the logs, the pattern in which the data need to be captured, the module and/or communication channel that need to be intercepted for data, and the logging application logic that needs to be executed. Multi-dimensional logging customizes the capturing of data into logs based on selected use cases and contexts, thereby providing a significant improvement in log analytics. The capability to host a multi-dimensional logging artifact as a cloud solution supports intelligent logging across multiple applications in distributed environments. Multi-dimensional logging helps administrators and/or troubleshooters to quickly comprehend their log data with better insight, thereby significantly improving trouble shooting and root-cause analysis. Multi-dimensional logging potentially reduces the amount of data stored in the logs since the multi-dimensional logging artifact will extract only the required information.

Figure 2:
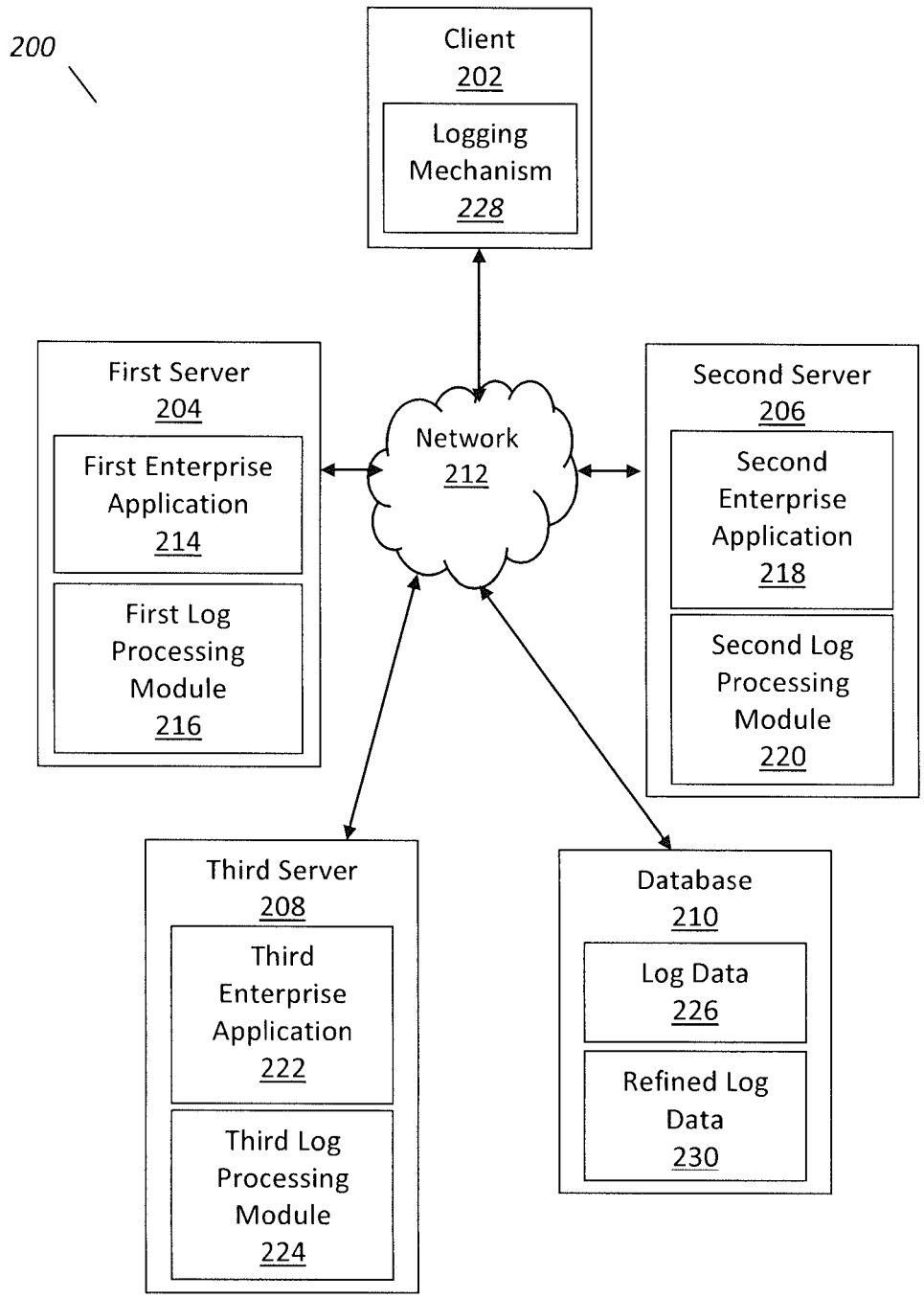
FIG. 2 illustrates a block diagram of an example system for multi-dimensional logging for enterprise applications, under an embodiment.

FIG. 2 illustrates a block diagram of a system that implements multi-dimensional logging for enterprise applications, under an embodiment. The multi-dimensional logging may be portable, such that it can configure multi-dimensional logging in many different environments. The multi-dimensional logging is scalable, configuring multi-dimensional logging for a distributed system of anywhere from two computers to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, a first server 204, a second server 206, and a third server 208 that are provided by a hosting company. The client 202 and the servers 204-208 communicate via a network 210, and may store data in a database 212. Although FIG. 2 depicts the database 212 as separate from the servers 204-208, the database 212 may reside partially or fully in any combination of the servers 204-208. Although FIG. 2 depicts the system 200 with one client 202, three servers 204-208, one network 210, and one database 212, the system 200 may include any number of clients 202, any number of servers 204-208, any number of networks 210, and any number of databases 212. Each of the client 202 and the servers 204-208 is substantially similar to the system 100 depicted in FIG. 1. The client 202 enables a user to communicate with the servers 204-208 in a distributed system.

The first server 204 executes a first enterprise application 214, which generates logs that are probed by a first log processing module 216. Similarly, the second server 206 executes a second enterprise application 218, which generates logs that are probed by a second log processing module 220. Likewise, the third server 208 executes a third enterprise application 222, which generates logs that are probed by a third log processing module 224. The log processing modules 216, 220, and 224 may store their logged data as log data 226 in the database 212.

The client 202 executes a logging mechanism 228 to generate a multi-dimensional logging artifact for enterprise applications, and utilize the multi-dimensional logging artifact with streaming log data or the stored log data 226 to create refined data 230. While FIG. 2 depicts the logging mechanism 228 that is executed by the client 202 as residing in the client 202, the logging mechanism 228 may also reside partially or wholly in the servers 204-208, such that the client 202 accesses the logging mechanism 228 via the servers 204-208 to execute the logging mechanism 228.

The logging mechanism 228 receives selections for multi-dimensional logging via the client 202 after outputting options for these selections to the client 202. These selections include log detail levels that range from the minimum log detail level to the maximum log detail level; contexts that include any combination of an analytics context, a security context, a performance context, and a health context; and use cases that include any combination of an export use case, a save use case, an import use case, a check-in use case, and a check-out use case.

The selections for multi-dimensional logging include a selection of log detail levels that range from a minimum log detail level to a maximum log detail level. For example, the user selects the log detail level 2. In another example, the user selects the log detail level 1. In yet another example, the user selects the log detail level 3.

The selections for multi-dimensional logging include any selections of contexts that include any combination of an analytics context, a security context, a performance context, and a health context. For example, the user selects the security context. In another example, the user selects the health context. In yet another example, the user selects the performance context.

The selections for multi-dimensional logging include any selections of use cases that include any combination of an export use case, a save use case, an import use case, a check-in use case, and a check-out use case. For example, the user selects the check-out use case. In another example, the user selects the import use case. In yet another example, the user selects every use case. Although a user may be typically interested in selecting a single context and a single use case, the user has the option to select multiple contexts and/or multiple use cases.

The logging mechanism 228 creates a multi-dimensional logging artifact based on selections of log detail levels, contexts, and use cases. For example, the logging mechanism 228 creates a multi-dimensional logging artifact for the combination of the check-out use case, the security context, and the level 2 log detail. In another example, the logging mechanism 228 creates a multi-dimensional logging artifact for the combination of the import use case, the health context, and the level 1 log detail. In yet another example, the logging mechanism 228 creates a multi-dimensional logging artifact for the combination of the performance context, the level 3 log detail, and every use case.

Context and use case play a key role to meaningfully convert the data required into the refined log data 230 for further investigation and processing. For each combination of the log detail level dimension, the context dimension, and the use case dimension, the logging mechanism 228 creates a multi-dimensional logging artifact, which is a piece of logging logic that captures the right information for that particular combination. The intersection of the use case dimension, the context dimension, and the log detail level dimension forms the multi-dimensional logging artifact. The multi-dimensional logging artifact defines what kind of information needs to captured, the format and/or pattern in which the information need to be captured specific to the selections of contexts, use cases, and log detail levels. The collection of combinations of such logging dimensions forms a log artifact grid. An example of a multi-dimensional logging artifact grid is referenced below in the description of FIG. 3. Each and every entity in the grid encapsulates the metadata and/or business logic to capture the required data from the related log processing modules 216, 220, and 224, or the log data 226. A multi-dimensional logging artifact can be developed for each enterprise application, based on each enterprise application's requirements.

The logging mechanism 228 utilizes the multi-dimensional logging artifact with the log data 226 to create the refined log data 230 based on the selections of log detail levels, contexts, and use cases. For example, the refined log data 230 may be based on the combination of the check-out use case, the security context, and the level 2 log detail. In another example, the refined log data 230 may be based on the combination of the import use case, the health context, and the level 1 log detail. In yet another example, the refined log data 230 may be based on the combination of the performance context, the level 3 log detail, and every use case. The multi-dimensional logging artifact may be utilized in two modes, a streaming mode and a persistence mode.

In case of the streaming mode, the log data 226 can create the refined log data 230 by utilizing the multi-dimensional logging artifact with a running application on the fly. The log artifact grid can be run either locally, on a dedicated log server, or as a cloud software as a service (SaaS) solution. The streaming mode does not require the logging related business logic to be embedded into the enterprise applications 214, 218, and 222 because the streaming mode provides the capability of attaching and detaching a multi-dimensional logging artifact on the fly, and has the ability to intercept the calls and/or data that is logged in the context of the enterprise applications 214, 218, and 222. With the advent of cloud based systems in the recent times, where any system can be composed on modules running on multiple clouds, it becomes quite important to capture the details regarding the flow of data between the modules and/or external entities, access patterns etc. So in this case, multi-dimensional logging in the streaming mode allows multi-dimensional logging artifacts to be associated with the modules on the fly, and ensures that the right set of data is captured in the required format.

In the persistence mode, multi-dimensional logging can also be effectively used to extract the required information from the log data 226 that has already been captured using generic logging frameworks, such as log 4j etc. In case of the persistence mode, the multi-dimensional logging artifact encapsulates the business logic required to identify the necessary data in the target format. Here the multi-dimensional logging artifact helps to identify the template and pattern for information extraction to enhance log analytics.

Figure 3:
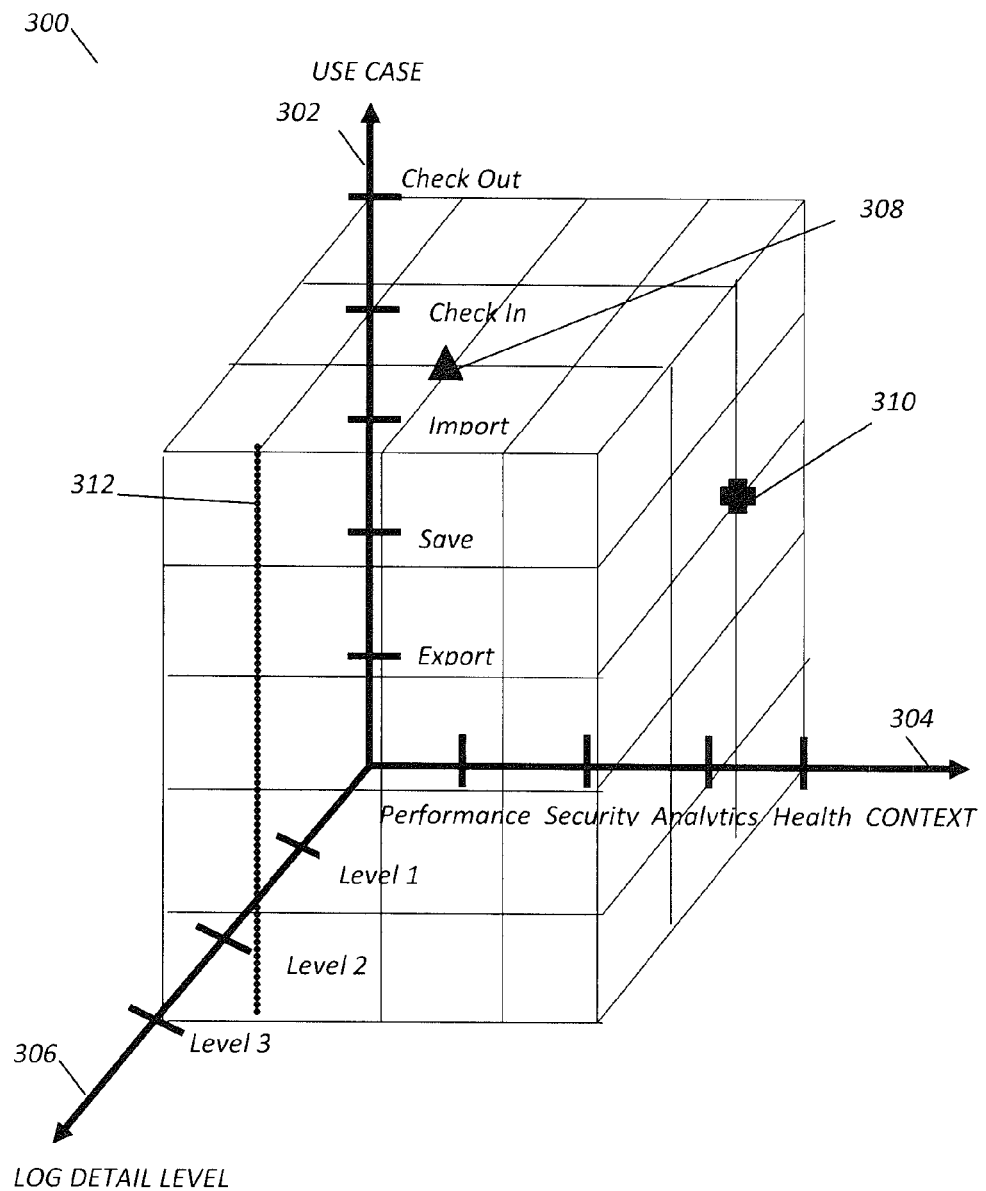
FIG. 3 illustrates a diagram of an example multi-dimensional logging artifact grid for enterprise applications, under an embodiment.

Multi-dimensional logging can be enhanced by adding the capability of viewing a multi-dimension logging artifact, which provides end-users a customized view of a multi-dimensional logging artifact grid that includes the multi-dimensional logging artifact used to create the refined log data 230. For a more basic custom view, the logging mechanism 228 may output, via the client 202, a list of the selections of log detail levels, contexts, and use cases. FIG. 3, which is referenced below, is an example of the logging mechanism 228 outputting a multi-dimensional graphic that represents a multi-dimensional logging artifact grid that includes the multi-dimensional logging artifacts for the user-selected customized combinations of the selections of log detail levels, contexts, and use cases. For example, the custom view may depict one multi-dimensional logging artifact that a user selected for the check-out use case, the security context, and the log detail level 2, another multi-dimensional logging artifact that a user selected for the import use case, the health context, and the log detail level 1, and yet another multi-dimensional logging artifact that a user selected for the performance context, the log detail level 3, and every use case.

The refined log data 230 assists a user in evaluating an enterprise application. Multi-dimensional logging provides better control over the kind of the data that need to be captured for the refined log data 230, the pattern in which the refined log data 230 needs to be captured, the module and/or communication channel that need to be intercepted for the refined log data 230, and the logging application logic that needs to be executed. Multi-dimensional logging customizes the capturing of data for refined log data 230 based on selected use cases and contexts, thereby providing a significant improvement in log analytics. The capability to host a multi-dimensional logging artifact as a cloud solution supports intelligent logging across multiple applications in distributed environments. Multi-dimensional logging helps administrators and/ or troubleshooters to quickly comprehend their log data with better insight, thereby significantly improving trouble shooting and root-cause analysis. Multi-dimensional logging potentially reduces the amount of data stored in the refined log data 230 because the multi-dimensional logging artifact will extract only the required information.

FIG. 3 illustrates a diagram of an example multi-dimensional logging artifact grid for enterprise applications, under an embodiment. A multi-dimensional logging artifact grid 300 is depicted on a three dimensional graph using the standard x, y, and z axes. The use case axis 302 is vertical (the standard y axis) and includes demarcations for an export use case, a save use case, an import use case, a check-in use case, and a check-out use case. The context axis 302 is horizontal (the standard x axis) and includes demarcations for a performance context, a security context, an analytics context, and a health context. The log detail level axis 302 is diagonal (the standard z axis) and includes demarcations for a log detail level 1, a log detail level 2, and a log detail level 3. Specific portions of the multi-dimensional logging artifact grid 300 depict previously selected multi-dimensional logging artifacts, or previously selected combinations of dimensions.

For example, the triangle 308 is located at the fifth and highest use case dimension, the check-out use case, the second context dimension, the security context, and the second log detail level dimension, the log detail level 2. Therefore, the triangle 308 represents a multi-dimensional logging artifact that a user selected for the check-out use case, the security context, and the log detail level 2.

In another example, the cross 310 is located at the third use case dimension, the import use case, the fourth context dimension, the health context, and the first log detail level dimension, the log detail level 1. Therefore, the cross 310 represents a multi-dimensional logging artifact that a user selected for the import use case, the health context, and the log detail level 1.

In yet another example, the dotted line 312 is located at the first context dimension, the performance context, and the third log detail level dimension, the log detail level 3. The dotted line 312 traverses each use case dimension, the export use case, the save use case, the import use case, the check-in use case, and the check-out use case. Therefore, the dotted line 312 represents a multi-dimensional logging artifact that a user selected for the performance context, the log detail level 3, and every use case.

Figure 4:
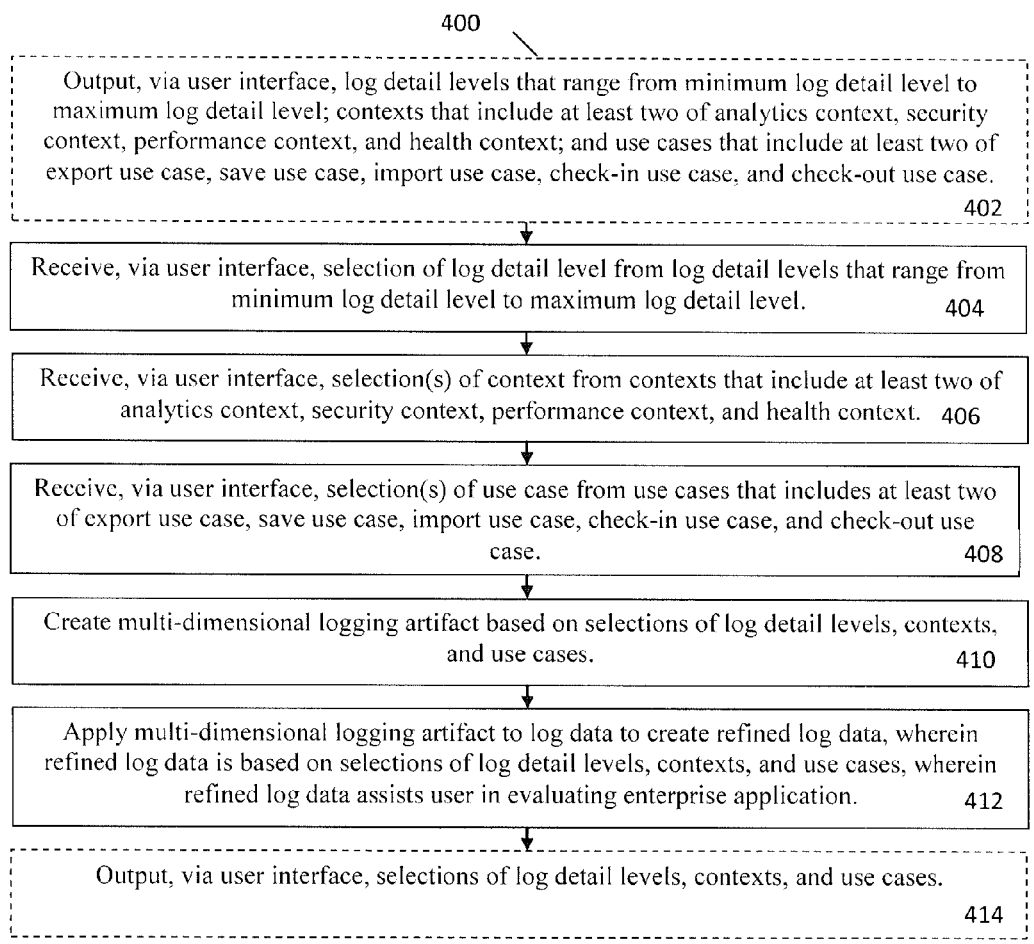
FIG. 4 is a flowchart that illustrates an example method of multi-dimensional logging for enterprise applications, under an embodiment.

FIG. 4 is a flowchart that illustrates a method of multi-dimensional logging for enterprise applications, in an embodiment. Flowchart 400 illustrates method acts illustrated as flowchart blocks for certain steps involved in and between the client 202 and the servers 204-208 of FIG. 2.

Log detail levels that range from a minimum log detail level to a maximum log detail level; contexts that include at least two of an analytics context, a security context, a performance context, and a health context; and use cases that include at least two of an export use case, a save use case, an import use case, a check-in use case, and a check-out use case, are optionally output via a user interface, act 402. For example, the logging mechanism 228 outputs the log detail levels, the contexts, and the use cases for a user to select via the client 202.

A selection of a log detail level from log detail levels that range from a minimum log detail level to a maximum log detail level are received via a user interface, act 404. For example, the logging mechanism 228 receives a selection of the log detail level 2 via the client 202. In another example, the logging mechanism 228 receives a selection of the log detail level 1 via the client 202. In yet another example, the logging mechanism 228 receives a selection of the log detail level 3 via the client 202.

Any selections from contexts that include at least two of an analytics context, a security context, a performance context, and a health context are received via the user interface, act 406. For example, the logging mechanism 228 receives a selection of the security context via the client 202. In another example, the logging mechanism 228 receives a selection of the health context via the client 202. In yet another example, the logging mechanism 228 receives a selection of the performance context via the client 202.

Any selections of use cases that include at least two of an export use case, a save use case, an import use case, a check-in use case, and a check-out use case are received via the user interface, act 408. For example, the logging mechanism 228 receives a selection of the check-out use case via the client 202. In another example, the logging mechanism 228 receives a selection of the import use case via the client 202. In yet another example, the logging mechanism 228 receives a selection of every use case via the client 202.

A multi-dimensional logging artifact is created based on selections of log detail levels, contexts, and use cases, act 410. For example, the logging mechanism 228 creates a multi-dimensional logging artifact which is represented by the triangle 308 in FIG. 3. In another example, the logging mechanism 228 creates a multi-dimensional logging artifact which is represented by the cross 310 in FIG. 3. For example, the logging mechanism 228 creates a multi-dimensional logging artifact which is represented by the dotted line 312 in FIG. 3

The multi-dimensional logging artifact is utilized with log data to create refined log data, wherein the refined log data is based on selections of log detail levels, contexts, and use cases, and wherein the refined log data assists a user in evaluating at least one aspect of an enterprise application, act 412. For example, the logging mechanism 228 utilizes the multi-dimensional logging artifact with the log data 226 to create the refined log data 230 based on the combination of the check-out use case, the security context, and the level 2 log detail. In another example, the logging mechanism 228 utilizes the multi-dimensional logging artifact with the log data 226 to create the refined log data 230 based on the combination of the import use case, the health context, and the level 1 log detail. In yet another example, the logging mechanism 228 utilizes the multi-dimensional logging artifact with the log data 226 to create the refined log data 230 based on the combination of the performance context, the level 3 log detail, and every use case.

The selections of log detail levels, contexts, and use cases are optionally output via the user interface, act 414. For example, the logging mechanism 228 outputs the multi-dimensional logging artifact grid 300 depicted in FIG. 3 via the client 202.

Although FIG. 4 depicts the acts 402-414 occurring in a specific order, the acts 402-414 may occur in another order. The refined log data 230 assists a user in evaluating an enterprise application. Multi-dimensional logging provides better control over the kind of the data that need to be captured for the refined log data 230, the pattern in which the refined log data 230 needs to be captured, the module and/or communication channel that need to be intercepted for the refined log data 230, and the logging application logic that needs to be executed. Multi-dimensional logging customizes the capturing of data for refined log data 230 based on selected use cases and contexts, thereby providing a significant improvement in log analytics. The capability to host a multi-dimensional logging artifact as a cloud solution supports intelligent logging across multiple applications in distributed environments. Multi-dimensional logging helps administrators and/or troubleshooters to quickly comprehend their log data with better insight, thereby significantly improving trouble shooting and root-cause analysis. Multi-dimensional logging potentially reduces the amount of data stored in the refined log data 230 because the multi-dimensional logging artifact will extract only the required information.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for multi-dimensional logging for enterprise applications, the system comprising:
    a processor based logging mechanism, which when executed on a computer, will cause the processor to:
        receive, via a user interface, at least one selection of a log detail level from a plurality of log detail levels that range from a minimum log detail level to a maximum log detail level;
        receive, via the user interface, at least one selection of a context from a plurality of contexts that comprises at least two of an analytics context, a security context, a performance context, and a health context;
        receive, via the user interface, at least one selection of a use case from a plurality of use cases that comprise at least two of an export use case, a save use case, an import use case, a check-in use case, and a check-out use case;
        create a multi-dimensional logging artifact based on at least one selected log detail level, at least one selected context, and at least one selected use case; and
        utilize the multi-dimensional logging artifact with log data to create refined log data, wherein the refined log data is based on the at least one selected log detail level, the at least one selected context, and the at least one selected use case, and wherein the refined log data assists a user in evaluating an enterprise application.

2. The system of claim 1, wherein the logging mechanism further outputs, via the user interface, the plurality of log detail levels that range from the minimum log detail level to the maximum log detail level; the plurality of contexts that comprises at least two of the analytics context, the security context, the performance context, and the health context; and the plurality of use cases that comprises at least two of the export use case, the save use case, the import use case, the check-in use case, and the check-out use case.

3. The system of claim 1, wherein the log data is log data that is created after the utilization of the multi-dimensional artifact.

4. The system of claim 1, wherein the log data is log data that is created before the utilization of the multi-dimensional artifact.

5. The system of claim 1, wherein the logging mechanism further outputs, via the user interface, the at least one selected log detail level, the at least one selected context, and the at least one selected use case.

6. The system of claim 5, wherein outputting the at least one selected log detail level, the at least one selected context, and the at least one selected use case comprises outputting a multi-dimensional graphic that represents the at least one selected log detail level, the at least one selected context, and the at least one selected use case.

7. A computer-implemented method for multi-dimensional logging for enterprise applications, the method comprising:
    receiving, via a user interface, at least one selection of a log detail level from a plurality of log detail levels that range from a minimum log detail level to a maximum log detail level;
    receiving, via the user interface, at least one selection of a context from a plurality of contexts that comprises at least two of an analytics context, a security context, a performance context, and a health context;
    creating multi-dimensional logging artifact based on at least one selected log detail level and at least one selected context; and
    utilizing the multi-dimensional logging artifact with log data to create refined log data, wherein the refined log data is based on the at least one selected log detail level and the at least one selected context, and wherein the refined log data assists a user in evaluating an enterprise application.

8. The method of claim 7, further comprising outputting, via the user interface, the plurality of log detail levels that range from the minimum log detail level to the maximum log detail level; the plurality of contexts that comprises at least two of the analytics context, the security context, the performance context, and the health context; and a plurality of use cases that comprises at least two of an export use case, a save use case, an import use case, a check-in use case, and a check-out use case.

9. The method of claim 7, wherein the log data is log data that is created after the utilization of the multi-dimensional artifact.

10. The method of claim 7, wherein the log data is log data that is created before the utilization of the multi-dimensional artifact.

11. The method of claim 7, further comprising outputting, via the user interface, the at least one selected log detail level and the at least one selected context.

12. The method of claim 11, wherein outputting the at least one selected log detail level and the at least one selected context comprises outputting a multi-dimensional graphic that represents the at least one selected log detail level and the at least one selected context.

13. The method of claim 7, further comprising receiving, via the user interface, at least one selection of a use case from a plurality of use cases that comprise at least two of an export use case, a save use case, an import use case, a check-in use case, and a check-out use case; wherein creating the multi-dimensional logging artifact is further based at least one selected use case; and wherein the refined log data is further based on the at least one selected use case.

14. A computer program product, comprising a non-transitory computer-readable medium having a computer-readable program code embodied therein, the computer-readable program code including instructions adapted to be executed by one or more processors to:
 receive, via a user interface, at least one selection of a log detail level from a plurality of log detail levels that range from a minimum log detail level to a maximum log detail level;
 receive, via the user interface, at least one selection of a use case from a plurality of use cases that comprise at least two of an export use case, a save use case, an import use case, a check-in use case, and a check-out use case;
 create a multi-dimensional logging artifact based on at least one selected log detail level and at least one selected use case; and
 utilize the multi-dimensional logging artifact with log data to create refined log data, wherein the refined log data is based on the at least one selected log detail level and the at least one selected use case, and wherein the refined log data assists a user in evaluating an enterprise application.

15. The computer program product of claim 14, the program code including further instructions to output, via the user interface, the plurality of log detail levels that range from the minimum log detail level to the maximum log detail level; the plurality of use cases that comprises at least two of the export use case, the save use case, the import use case, the check-in use case, and the check-out use case; and a plurality of contexts that comprises at least two of an analytics context, a security context, a performance context, and a health context.

16. The computer program product of claim 14, wherein the log data is log data that is created after the utilization of the multi-dimensional artifact.

17. The computer program product of claim 14, wherein the log data is log data that is created before the utilization of the multi-dimensional artifact.

18. The computer program product of claim 14, the program code including further instructions to output via the user interface, the at least one selected log detail level and the at least one selected use case.

19. The computer program product of claim 18, wherein outputting the at least one selected log detail level and the at least one selected use case comprises outputting a multi-dimensional graphic that represents the at least one selected log detail level and the at least one selected use case.

20. The computer program product of claim 14, the program code including further instructions to receive via the user interface, at least one selection of a context from a plurality of contexts that comprises at least two of an analytics context, a security context, a performance context, and a health context; wherein creating the multi-dimensional logging artifact is further based on at least one selected context; and wherein the refined log data is further based on the at least one selected context.

\* \* \* \* \*